United States Patent [19]

Martin

[11] 4,046,355

[45] Sept. 6, 1977

[54] DRAWWORKS CONTROL APPARATUS

[76] Inventor: T. Edward Martin, 3624 NW. 19th, Oklahoma City, Okla. 73107

[21] Appl. No.: 638,836

[22] Filed: Dec. 8, 1975

[51] Int. Cl.² .............................................. B66D 1/48
[52] U.S. Cl. ................................. 254/173 R; 254/172
[58] Field of Search ............... 254/173 R, 173 B, 172; 187/1 R, 29 R; 303/106

[56] References Cited

U.S. PATENT DOCUMENTS

| | | | |
|---|---|---|---|
| 2,867,411 | 1/1959 | Simmonds et al. | 254/173 B |
| 2,931,628 | 4/1960 | Simmonds et al. | 254/173 B |
| 3,104,864 | 9/1963 | Melton et al. | 254/173 B |
| 3,461,978 | 8/1969 | Whittle | 254/172 |
| 3,759,489 | 9/1973 | Jones | 254/173 R |
| 3,833,270 | 9/1974 | Gotz et al. | 303/106 |
| 3,874,741 | 4/1975 | Schnaibel et al. | 303/106 |

Primary Examiner—Robert J. Spar
Assistant Examiner—Donald W. Underwood
Attorney, Agent, or Firm—Dunlap, Codding & McCarthy

[57] ABSTRACT

A control apparatus for use with a drawworks assembly having a work piece suspended from, and applying tension to, a cable, one end of the cable being wound on a drum, the rotation of which is controlled by a power brake mechanism, the control apparatus comprising a cable tension sensor producing a tension signal proportional to the tension in the cable, a pulse generator producing a pulsed control signal and a brake control applying the tension signal to the power brake mechanism in response to the control signal.

5 Claims, 1 Drawing Figure

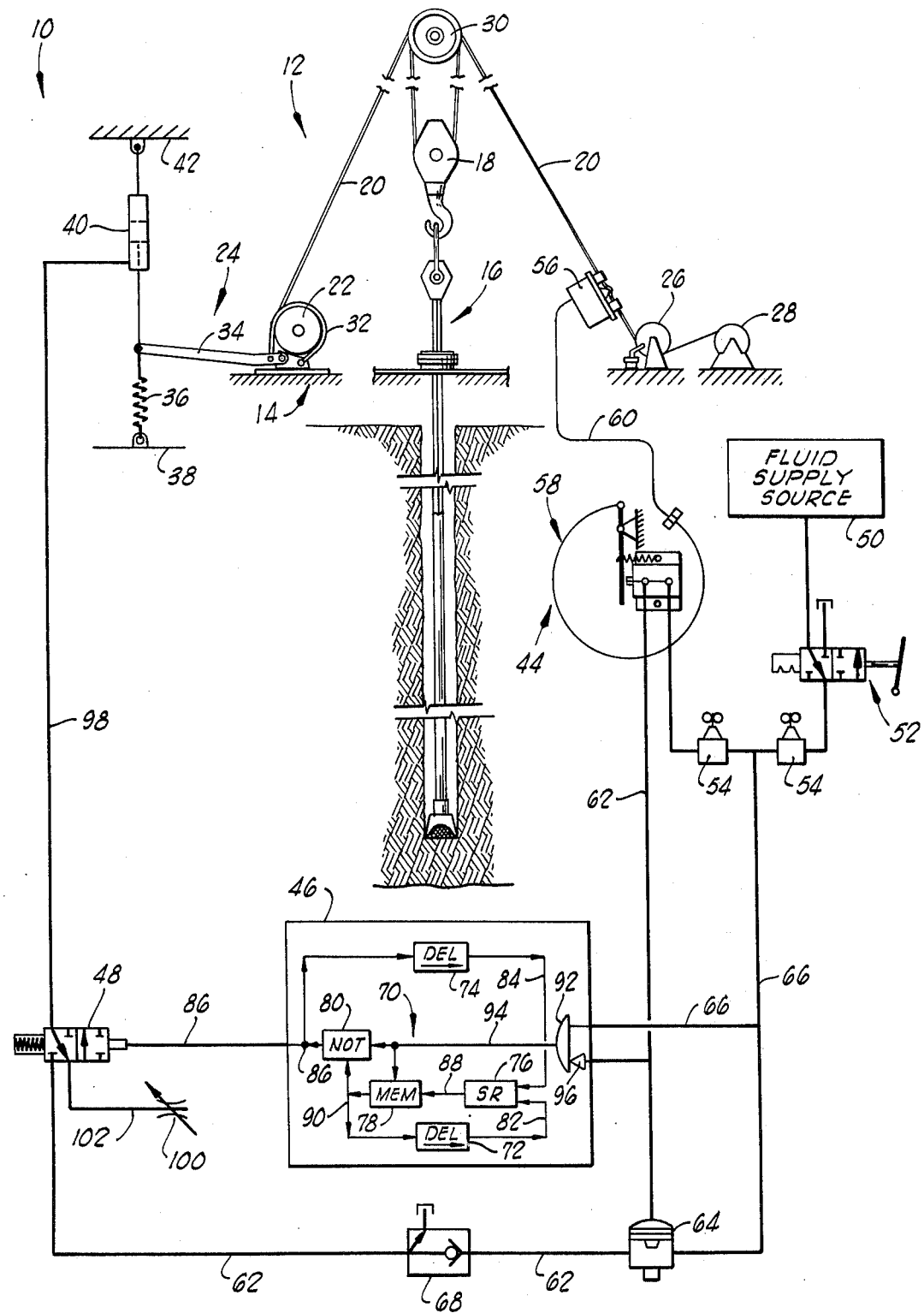

DRAWWORKS CONTROL APPARATUS

BACKGROUND OF THE INVENTION

1. Field of the Invention

This invention relates generally to improvements in control apparatus and, more particularly, but not by way of limitation, to a control apparatus for use with a drawworks assembly having a work piece suspended from and applying tension to, a cable, one end of the cable being wound on a drum, the rotation of which is controlled by a power brake mechanism.

2. The Description of the Prior Art

Various types of control apparatus have been developed for use with a drawworks assembly having a work piece suspended from, and applying tension to, a cable, one end of the cable being wound on a drum, the rotation of which is controlled by a power brake mechanism. Generally, such control apparatus senses the tension in the cable and attempts to control the payout of cable from the drum when the tension in the cable exceeds a predetermined level. Such control apparatus have been generally unacceptable for any one of a number of the following reasons: Many such control apparatus require extensive modification to the existing drawworks; many such control apparatus are capable of only gross control of cable payout due to a general inability to precisely control the power brake mechanism; many of such control apparatus require a feedback mechanism to sense the rotation of the drum in order to prevent drum runaway; and many of such control apparatus depend upon an electrical power source and thus are highly susceptible to the introduction of spurious noise with a subsequent degradation in performance.

For example, the automatic well drilling apparatus described in U.S. Pat. No. Re. 24,818 issued Apr. 26, 1960 to W. C. Gresham et al., is subject to several of the above described disadvantages. The control apparatus described therein is powered electrically and thus is subject to the introduction of extraneous noise and thus must either be shielded or suffer a degradation in performance under certain field operating conditions. In addition, the control apparatus exhibits a marked degree of inflexibility since it is unable to actuate the power brake mechanism at any point other than a full brake release or a full brake engage. When the Gresham control apparatus is used on a drawworks assembly whose braking system has been worn to the point where lobes have been formed on the brake-engaging surfaces of the drum, the performance of this system becomes particularly irratic and disruptive.

The control apparatus shown and described in U.S. Pat. No. 3,759,489, issued to Harry C. Jones on Sept. 18, 1973, exhibits many of the disadvantages described above in relation to the Gresham control apparatus. For example, the Jones apparatus being electrically powered, is also susceptible to the introduction of spurious noise with the resulting degradation in performance. In addition, the Jones control apparatus is similarly unable to manipulate the power brake mechanism in other than a gross on-off manner. However, the Jones control apparatus also displays the additional disadvantage of requiring a drum rotation feedback sensor in an attempt to prevent drum runaway.

SUMMARY OF THE INVENTION

An object of this invention is to provide a control apparatus capable of fine control of cable payout from a power brake controlled drawworks assembly.

Another object of this invention is to provide a control apparatus which is highly immune to the introduction of noise.

A further object of this invention is to provide a control apparatus which may be installed for use on a drawworks assembly with only a minimum amount of modification.

A still further object of this invention is to provide a control apparatus which is highly reliable and predictable in operation.

Yet another object of this invention is to provide a control apparatus which is very economical in construction and simple in operation.

Other objects and advantages of the invention will be evident from the following detailed description when read in conjunction with the accompanying drawings which illustrate various embodiments of the invention.

BRIEF DESCRIPTION OF THE DRAWING

The drawing is a partial schematic, diagrammatic view of a drawworks control apparatus constructed in accordance with the present invention in combination with a rotary drilling rig.

DESCRIPTION OF THE PREFERRED EMBODIMENT

Referring to the drawing, shown therein and referred to by the reference numeral 10 is a drawworks control apparatus, constructed in accordance with the present invention. For purposes of description, the drawworks control apparatus 10 is shown in combination with a conventional rotary drilling rig 12. The rotary drilling rig 12 consists of a drawworks assembly 14 and a rotary drilling unit 16. The drawworks assembly has a work piece 18 suspended from and applying tension to a cable 20. The cable 20 has one end thereof wound on a drum 22, the rotation of which is controlled by a power brake mechanism 24. The other end of the cable 20 is wound around an eccentrically mounted spool 26 and anchored to a storage drum 28. The intermediate portion of the cable 20 is maintained in an elevated position via a crown block 30 in a conventional manner.

The power brake mechanism 24 is comprised of a brake band 32 engageable with the drum 22 via a brake lever 34, a brake lever biasing spring 36 connected between the brake lever 34 and a support member 38, and an air brake actuator 40 connected between the brake lever 34 and another support member 42.

The various elements comprising the drawbacks control apparatus are designed to be supplied with clean, dry, pressurized air from a suitable fluid supply source 50 via an off-on switch 52 of conventional design. It is desirable in most applications to regulate the pressure of the air supplied to the various components comprising the drawworks control apparatus 10 by interposing a pair of regulators 54 between the drawworks control apparatus 10 and the switch 52 in order to stabilize the performance characteristics of the drawworks control apparatus 10.

The drawworks control apparatus 10 consists primarily of a cable tension sensor 44, a pulse generator 46 and a brake control 48. The cable tension sensor 44 includes a sensor 56 and a transducer 58. The sensor 56, which may be any one of a number of commercially available sensors such as that manufactured by Martin-Decker, is connected to the cable 20 and senses the tension therein. The sensor 56 produces an output signal the level of which is proportional to the sensed cable tension. The sensor output signal is applied to the transducer 58 via a signal path 60.

The transducer 58, which may be any one of a number of commercially available transducers such as that manufactured by Fisher-Piolet, receives the sensor output signal and produces a tension signal for application to the brake control 48 via a signal path 62, the level of the tension signal being proportional to the sensor output signal. Since the sensor output signal is proportional to the sensed cable tension and the tension signal is proportional to the sensor output signal, it follows that the tension signal is also proportional to the sensed cable tension.

In the preferred embodiment, an amplifier 64 is interposed between the cable tension sensor 44 and the brake control 48, the amplifier 64 also being connected to the fluid supply source via the signal path 66. The amplifier 64, which may be any one of a number of various commercially available amplifiers such as that made by Fisher, receives the tension signal from the cable tension sensor 44 and provides an amplified tension signal for application to the brake control 48.

In addition, the preferred embodiment includes a quick release 68 interposed between the cable tension sensor 44 and the brake control 48. More particularly, the quick release 68 is interposed in the signal path 62 between the amplifier 64 and the brake control 48. The quick release 68, which may be any one of a number of various commercially available quick releases such as that made by Westinghouse, prevents feedback from the brake control 48 to the cable tension sensor 44 by allowing communication from the cable tension sensor 44 to the brake control 48 but preventing communication from the brake control 48 to the cable tension sensor 44.

The pulse generator 46 is comprised primarily of a pulse producing unit 70, a pulse initiate time delay 72 and a pulse terminate time delay 74. The pulse producing unit 70 is comprised of a set-reset gate 76, a memory element 78, and a NOT gate 80. The pulse producing unit 70 is constructed to receive a pulse-initiate signal via a signal path 82 and a pulse-terminate signal via a signal path 84. In response to receiving the pulse-initiate signal, the pulse producing unit 70 initiates the production of a pulse of the control signal via a signal path 86. In response to receiving the pulse-terminate signal, the pulse producing unit 70 terminates the production of the pulse of the control signal. More particularly, the set-reset gate 76 receives the pulse-initiate signal via the signal path 82 and produces a memory signal in the high state for application to the memory element 78 via the signal path 88 in response to the received pulse-initiate signal. The set-reset gate 76 also receives the pulse-terminate signal via the signal path 84 and produces the memory signal in the low state in response to the received pulse-terminate signal. For the purposes of this description, it is to be understood that the various references to the signals as being in the high or low state are intended to be construed in accordance with the conventional digital definitions thereof.

The memory element 78, which is connected to the set-reset gate 76 via the signal path 88, receives the memory signal via the signal path 99 and continuously produces an output signal in the high stage for application to the NOT gate 80 via a signal path 90 in response to receiving the memory signal in the high state from the set-reset gate 76. The memory element 78 continuously produces an output signal in the low state for application to the NOT gate 80 in response to receiving the memory signal in the low state from the set-reset gate 76. Thus, the memory elements 78 will continuously produce an output signal path 90 in the same state as the state of the last memory signal received via the signal path 88.

The NOT gate 80, which is connected to the memory element 78 via the signal path 90, receives the memory element output signal and produces an output signal in the high state for application to the brake control 48 via the signal path 86 in response to receiving the memory element output signal in the low state. The NOT gate 80 produces an output signal in the low state via the signal path 86 in response to receiving the memory element output signal in the high state. Thus, the NOT gate 80 produces an output signal via the signal path 86 which is the digital inverse of the memory element output signal applied thereto via the signal path 90. Although the brake control 48 is shown in the drawing as being connected to the NOT gate 80 via the signal path 86, it will be clear to those skilled in the art that the control apparatus 10 would be operable in a substantially similar manner if the brake control 48 were connected instead to the memory element 78 via the signal path 90.

The pulse initiate time delay 72 is connected to the pulse producing unit 70 by being connected between the memory element 78 via the signal path 90 and the set-reset gate 78 via the signal path 82. The pulse initiate time delay 72 effectively senses the termination of production of the pulse of the control signal and produces the pulse-initiate signal for application to the pulse producing unit 70 a predetermined time period after sensing the termination of production of the pulse of the control signal. More particularly, the pulse initiate time delay 72 receives the memory element output signal via the signal path 90 and produces the pulse-initiate signal via the signal path 82 a predetermined time period after receiving the memory element output signal in the high state. In the preferred embodiment, the pulse initiate time delay 72 is a variable time delay so that the predetermined time period which the pulse initiate time delay 72 will delay the memory element output signal may be varied in response to changes in the operating environment of the drawworks control apparatus 10.

The pulse terminate time delay 74 is connected to the pulse producing unit 70 by being connected between the NOT gate 80 via the signal path 86 and the set-reset gate 78 via the signal path 84. The pulse terminate time delay 74 effectively senses the initiation of production of the pulse of the control signal and produces the pulse-terminate signal for application to the pulse producing unit 70 a predetermined time period after sensing the initiation of production of the pulse of the control signal. More particularly, the pulse terminate time delay 74 receives the NOT gate output signal via the signal path 86 and produces the pulse-terminate signal via the signal path 84 a predetermined time period after receiving the NOT gate output signal in the high state. In the preferred embodiment, the pulse terminate time delay 74 is a variable time delay so that the predetermined time period which the pulse terminate time delay 74 will delay the NOT gate output signal may be varied in response to changes in the operating environment of the drawworks control apparatus 10.

In the preferred embodiment, the memory element 78 and the NOT gate 80 of the pulse producing unit 70 are each constructed so as to be activated and deactivated in response to an activate signal applied thereto. Further, the pulse generator 46 includes a control gate 92 connected between the cable tension sensor 44, and the memory element 78 and NOT gate 80 of the pulse producing unit 70 via the signal path 94. The control gate 92 receives the tension signal via the signal path 62 and an amplifier portion 96 thereof, and deactivates the pulse producing unit 70 when the level of the received tension signal is less than a predetermined level so that the pulse producing unit 70 is unable to produce the pulsed control signal via the signal path 86. More particularly, the control gate 92 receives the tension signal via the signal path 62 and provides the activate signal for application to the memory element 78 and the NOT gate 80 via the signal path 94 when the level of the received tension signal exceeds a predetermined level. Upon receiving the activate signal from the control gate 92 via the signal path 94, the memory element 78 and the NOT gate 80 will operate substantially as described above, but, in the absence of the activate signal, the memory element 78 and the NOT gate 80 will be rendered substantially inoperative. Thus, the control gate 92 operates substantially as an off-on switch to turn the pulse generator 46 "on" only when the level of the tension signal applied to the pulse generator 46 via the signal path 62 exceeds the predetermined level. Preferably, the predetermined level at which the control gate 92 begins producing the activate signal is variable so as to be responsive to changing operative environment of the drawworks control apparatus 10.

In the preferred embodiment, the various elements comprising the pulse generator 46 are selected from among various types of commercially available pneumatic logic controls. For example, suitable components may be obtained from the ARO corporation of Byran, Ohio, according to the followng parts table:

| Element Name | Part No. |
| --- | --- |
| Pulse initiate time delay 72 | 59121 |
| Pulse terminate time delay 74 | 59121 |
| Set-reset gate 76 | 59181 |
| Memory element 78 | 59113 |
| NOT gate 80 | 59112 |
| Control gate 92 | 59175 |

The brake control 48 is connected to the pulse generator 46 via the signal path 86 and the air brake actuator 40 of the power mechanism 24 via the signal path 98. As was described above, the brake control 48 is also connected to the cable tension sensor 44 via the signal path 62, the amplifier 64, and the quick release 68. In addition, the brake control 48 has a variable resistor 100 connected thereto via a signal path 102. In the preferred embodiment, the brake control 48 is a three-way, normally closed, pilot operated valve, with the pilot being operated via the signal path 86 and the signal path 62 being connected to the normally closed port thereof.

The brake control 48 receives the control signal via the signal path 86 and the tension signal via the signal path 62 and applies the tension signal to the power brake mechanism 24 via the signal path 98 in response to the control signal. More particularly, the brake control 48 will block the passage of the tension signal from the signal path 62 to the signal path 98 in the absence of a pulse of the control signal on the signal path 86. Upon receiving a pulse of the control signal on the signal path 86, the brake control 48 will allow the passage of the tension signal from the signal path 62 to the signal path 98. In response to the termination of a pulse of the control signal on the signal path 86, the brake control 48 will disconnect the signal path 62 from the signal path 98 and connect the signal path 98 to the signal path 102 allowing the pressure in the signal path 98 to vent to atmosphere via the signal path 102 and the variable resistor 100. A suitable brake control 48 may be obtained from any one of a number of commercial manufacturers such as the Norgren Company, while the variable resistor 100 may be obtained from the Eastman Imperial Company.

OPERATION OF THE PREFERRED EMBODIMENT

In operation, the drawworks control apparatus 10 is installed on a conventional rotary drilling rig 12 as shown in the drawing. More particularly, the various operating elements comprising the drawworks control apparatus 10 are provided with operating power by being connected to the fluid supply source 50 via the off-on switch 52 and the regulators 54. In addition, the sensor 56 is connected to the cable 20 so as to be responsive to changes in the tension in the cable 20. Finally, the brake control 48 is connected to the air brake actuator 40 via the signal path 98.

As will be familiar to those skilled in the art, the drawworks control assembly 10 is normally allowed to control the payout of the cable 20 from the drum 22 only when the drilling rig 12 is actually performing a drilling operation. During other operations, the drawworks control apparatus 10 may be rendered inoperative by being disconnected from the fluid supply source via the off-on switch 52.

During drilling operations, the sensor 56 senses the tension in the cable 20 and produces an output signal for application to the transducer 58 via the signal path 60, the level of the sensor output signal being proportional to the sensed cable tension. The transducer 58 receives the sensor output signal and produces a tension signal for application to the brake control 48 via the signal path 62, the level of the tension signal being similarly proportional to the sensed cable tension. The amplifier 64, interposed between the cable tension sensor 44 and the brake control 48, receives the tension signal from the cable tension sensor 44 and provides an amplified tension signal for application to the normally closed port of the brake control 48.

As drilling operations proceed, more and more of the weight of the rotary drilling unit 16 is placed upon the cable 20 via the workpiece 18, thereby increasing the tension in the cable 20. As a result thereof, the level of the tension signal applied by the cable tension sensor 44 via the signal path 62 to the control gate 92 of the pulse generator 46 increases. When the level of the tension signal exceeds the predetermined level of the control gate 92, the control gate 92 begins producing the activate signal via the signal path 94 by connecting the signal path 94 to the fluid supply source 50 via the signal path 66.

In response to initially receiving the activate signal, the memory element 78 will produce an output signal in the low state via the signal path 90. Upon initially receiving the activate signal via the signal path 94 and the memory element output signal in the low state via the signal path 90, the NOT gate 80 will produce an output signal in the high state via the signal path 86. The NOT gate output signal is thereafter applied to the brake control 48 via the signal path 86 as the pulsed control signal.

In response to receiving the control signal in the high state from the NOT gate 80 via the signal path 86, the brake control 48 will connect the signal path 62 to the signal path 98 thereby allowing the amplified tension signal to actuate the power brake mechanism 24. Assuming that the amplified tension signal is sufficiently strong, the actuation of the power brake mechanism 24 will allow the drum 22 to rotate paying out the cable 20. Payout of the cable 20 lowers the workpiece 18 so that less of the weight of the rotary drilling unit 16 is carried by the cable 20.

It is desirable that the predetermined level of the control gate 92 be selected so that the pulse generator 46 will begin producing the pulsed control signal a relatively short period of time before the amplified tension signal has reached sufficient strength to cause the power brake mechanism 24 to permit rotation of the drum 22. In this way, the pulse generator 46, the brake control 48 and the power brake mechanism 24 will be operating only when necessary thus minimizing wear. Once the control gate 92 has actuated the pulse generator 46, the cable tension sensor 44 will continue to increase the strength of the tension signal until the power brake mechanism 24 is induced to permit rotation of the drum 22, thereby assuring that the drawworks control apparatus 10 will operate effectively even with a lobed drum 22.

The pulse terminate time delay 74 will also receive the NOT gate output signal via the signal path 86 and will produce the pulse-terminate signal for application to the set-reset gate 76 via the signal path 84 a predetermined time period after receiving the NOT gate output signal in the high state. In response to the pulse-terminate signal applied thereto, the set-reset gate 76 will produce a memory signal in the high state for application to the memory element 78 via the signal path 88. In response to receiving the memory signal in the high state, the memory element 78 will produce an output signal in the high state for application to the NOT gate 80 via the signal path 90. Upon receiving the memory element output signal in the high state, the NOT gate 80 will produce an output signal in the low state via the signal path 86.

In response to receiving the NOT gate output signal in the low state via the signal path 86, the brake control 48 will disconnect the signal path 62 from the signal path 98 and connect the signal path 98 to the signal path 102 thereby allowing the pressure in the air brake actuator 40 to vent to atmosphere via the signal path 98, the brake control 48, the signal path 102 and the variable resistor 100. The variable resistor 100 may be adjusted so that the pressure in the air brake actuator 40 is vented in a controlled manner to prevent damage thereto.

The pulse initiate time delay 72 will also receive the memory element output signal via the signal path 90 and will produce the pulse-initiate signal for application to the set-reset gate 76 via the signal path 82 a predetermined time period after receiving the memory element output signal in the high state. In response to the pulse-initiate signal applied thereto, the set-reset gate 76 will produce a memory signal in the low state for application to the memory element 78 via the signal path 88. In response to receiving the memory signal in the low state, the memory element 78 will produce an output signal in the low state for application to the NOT gate 80 via the signal path 90. Upon receiving the memory element output signal in the low state, the NOT gate 80 will produce an output signal in the high state via the signal path 86. The above described pulse producing cycle will be thereafter repeated so long as the control gate 92 continues to apply the activate signal to the memory element 78 and the NOT gate 80 via the signal path 94.

As will be clear to those skilled in the art, the strength of the pulses applied to the power brake mechanism 24 will be proportional to the tension in the cable. Further, the period of time during which the brake control 48 will be applying the tension signal to the power brake mechanism 24 is controlled by the pulse terminate time delay 74. In addition, the period of time between the pulses applied by the brake control 48 to the power brake mechanism 24 is controlled by the pulse initiate time delay 72. Finally, the level of the tension in the cable 20 at which the brake control 48 will begin applying actuating pulses to the power brake mechanism 24 is controlled by the control gate 92 and particularly the amplifier portion 96 thereof.

Changes may be made in the construction and the arrangement of the parts of the elements of the preferred embodiment as disclosed herein without departing from the spirit and scope of the invention as defined in the following claims.

What is claimed is:

1. In combination with a drawworks assembly having a work piece suspended from, and applying tension to, a cable, one end of the cable being wound on a drum, the rotation of which is controlled by a power brake mechanism, a control apparatus comprising:

a cable tension sensing means connected to the cable, the cable tension sensing means sensing the tension in the cable and producing a tension signal the level of which is proportional to the sensed cable tension;

pulse generating means for producing a pulsed control signal comprising:

pulse producing means for receiving a pulse-initiate signal and a pulse-terminate signal, initiating the production of a pulse of the control signal in response to receiving the pulse-initiate signal, and terminating the production of the pulse of thhe control signal in response to receiving the pulse-terminate signal;

pulse initiate means connected to the pulse producing means, the pulse initiate means sensing the termination of production of the pulse of the control signal and producing the pulse-initiate signal for application to the pulse producing means a predetermined time period after sensing the termination of production of the pulse of the control signal; and pulse terminate means connected to the pulse producing means, the pulse terminate means sensing the initiation of production of the pulse of the control signal and producing the pulse-terminate signal for application to the pulse producing means a predetermined time period after sensing the initiation of production of the pulse of the control signal;

brake control means connected to the pulse generating means and to the cable tension sensing means, the brake control means receiving the control signal and the tension signal and applying the tension signal to the power brake mechanism in response to the pulses of the control signal, whereby the power brake mechanism is actuated in a pulsed manner, the strength of the pulses being proportional to the tension in the cable.

2. The apparatus of claim 1 wherein the pulse generating means is further defined to include:
a control gate connected to the cable tension sensing means and to the pulse producing means, the control gate receiving the tension signal and deactivating the pulse producing means when the level of the received tension signal is less than a predetermined level so that the pulse producing means is unable to produce the pulsed control signal.

3. The apparatus of claim 1 wherein the pulse producing means is further characterized to include:
a set-reset gate connected to the pulse initiate means and the pulse terminate means, the set-reset gate receiving the pulse-initiate signal and the pulse-terminate signal and producing a memory signal in the low state in response to receiving the pulse-initiate signal and a memory signal in the high state in response to receiving the pulse-terminate signal;
a memory element connected to the set-reset gate, the memory element receiving the memory signal and continuously producing an output signal in the high state in response to receiving the memory signal in the high state and an output signal in the low state in response to receiving the memory signal in the low state; and
a NOT gate connected to the memory element, the NOT gate receiving the memory element output signal and producing an output signal in the high state in response to receiving the memory element output signal in the low state and an output signal in the low state in response to receiving the memory element output signal in the high state, wherein one of the signals output from the memory element and the NOT gate may be applied to the brake control means as the pulsed control signal.

4. The apparatus of claim 1 wherein the pulse initiate means and the pulse terminate means are each further defined as a variable time delay.

5. In combination with a drawworks assembly having a work piece suspended from, and applying tension to, a cable, one end of the cable being wound on a drum, the rotation of which is controlled by a power brake mechanism, a control apparatus comprising:
cable tension sensing means connected to the cable, the cable tension sensing means sensing the tension in the cable and producing a tension signal the level of which is proportional to the sensed cable tension;
pulse generating means for producing a pulsed control signal; and
brake control means connected to the pulse generating means and to the cable tension sensing means, the brake contol means receiving the control signal and the tension signal and applying the tension signal to the power brake mechanism in response to the pulses of the control signal, whereby the power brake mechanism is actuated in a pulsed manner, the strength of the pulses being proportional to the tension in the cable wherein the pulse generating means is further defined to include:
a set-reset gate receiving a pulse-initiate signal and a pulse-terminate signal, and producing a memory signal in the low state in response to receiving the pulse-initiate signal and a memory signal in the high state in response to receiving the pulse-terminate signal;
a memory element connected to the set-reset gate, the memory element receiving an activate signal and the memory signal, and, in response to the received activate signal, continuously producing an output signal in the same state as the state of the last received memory signal;
a NOT gate connected to the memory element, the NOT gate receiving the activate signal and the memory element output signal and in response to the received activate signal, producing an output signal in the high state in response to receiving the memory element output signal in the low state and an output signal in the low state in response to receiving the memory element output signal in the high state, wherein one of the signals output from the memory element and the NOT gate may be applied to the brake control means as the pulsed control signal;
a pulse initiate time delay connected to the memory element and the set-reset gate, the pulse initiate time delay receiving the memory element output signal and producing the pulse-initiate signal a predetermined time period after receiving the memory element output signal in the high state;
a pulse terminate time delay connected to the NOT gate and to the set-reset gate, the pulse terminate time delay receiving the NOT gate output signal and producing the pulse-terminate signal a predetermined time period after receiving the NOT gate output signal in the high state; and
a control gate connected to the cable tension sensing means and to the memory element, the control gate receiving the tension signal and providing the activate signal when the level of the received tension signal exceeds a predetermined level.

* * * * *